March 26, 1957 R. D. CHAPIN 2,786,715
TRACK MOUNTED SPRINKLING DEVICE
Filed March 4, 1955 6 Sheets-Sheet 1
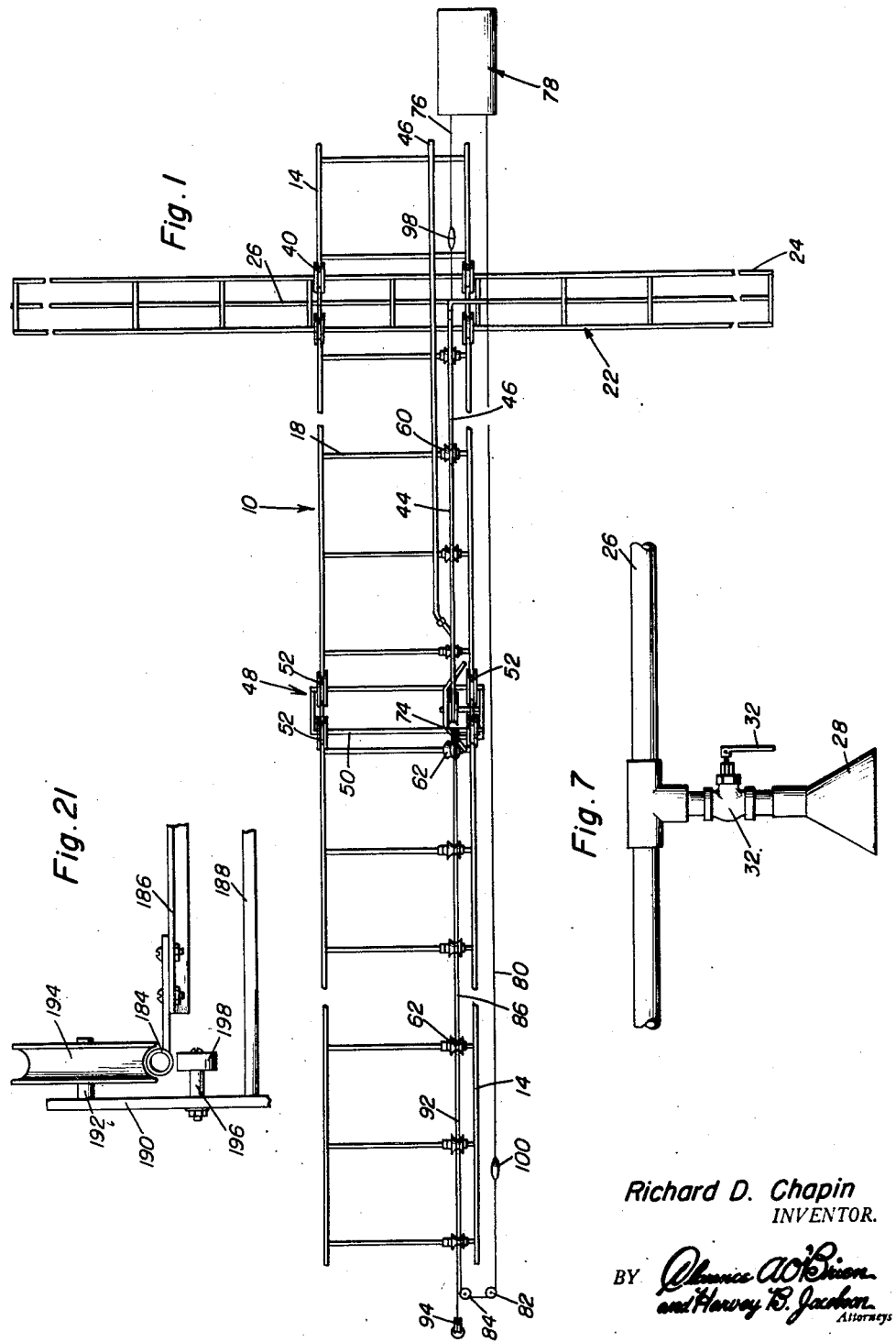
Richard D. Chapin
INVENTOR.

March 26, 1957 R. D. CHAPIN 2,786,715
TRACK MOUNTED SPRINKLING DEVICE
Filed March 4, 1955 6 Sheets-Sheet 2
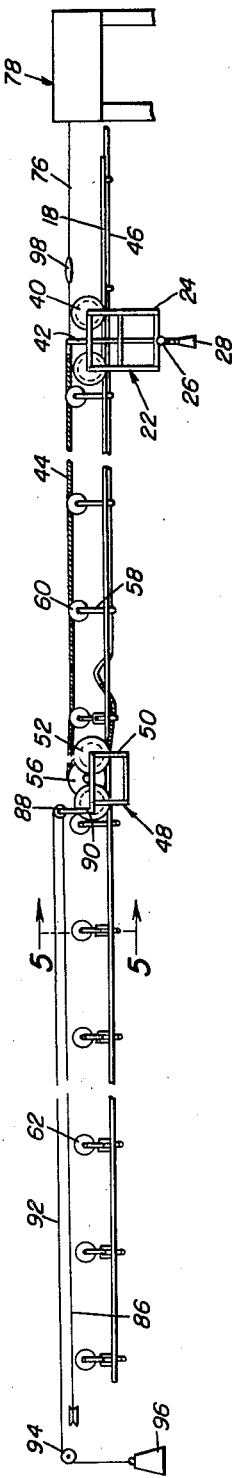
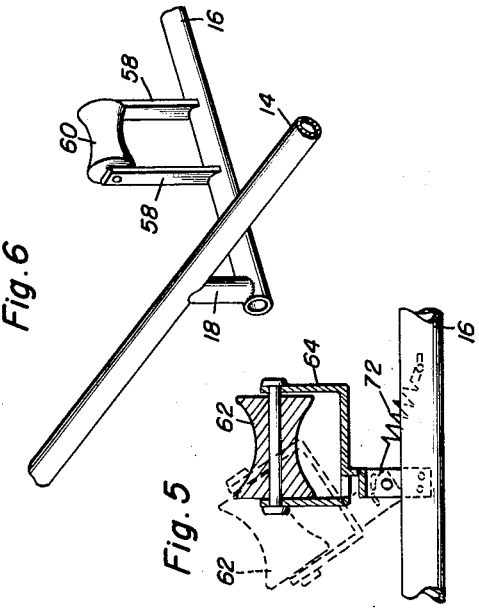
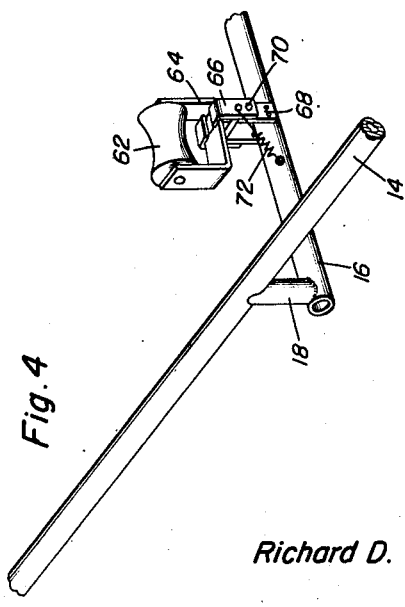
Richard D. Chapin
INVENTOR.

March 26, 1957 R. D. CHAPIN 2,786,715
TRACK MOUNTED SPRINKLING DEVICE
Filed March 4, 1955 6 Sheets-Sheet 3
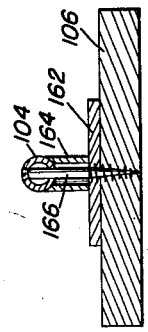
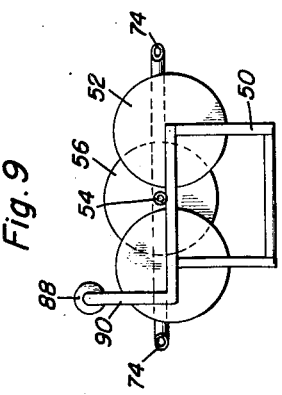
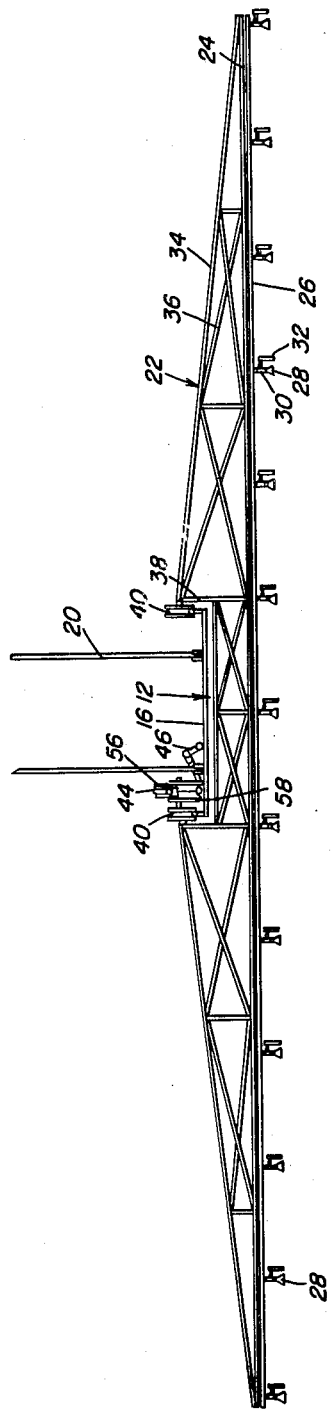
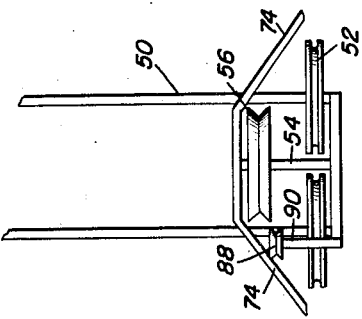
Richard D. Chapin
INVENTOR.

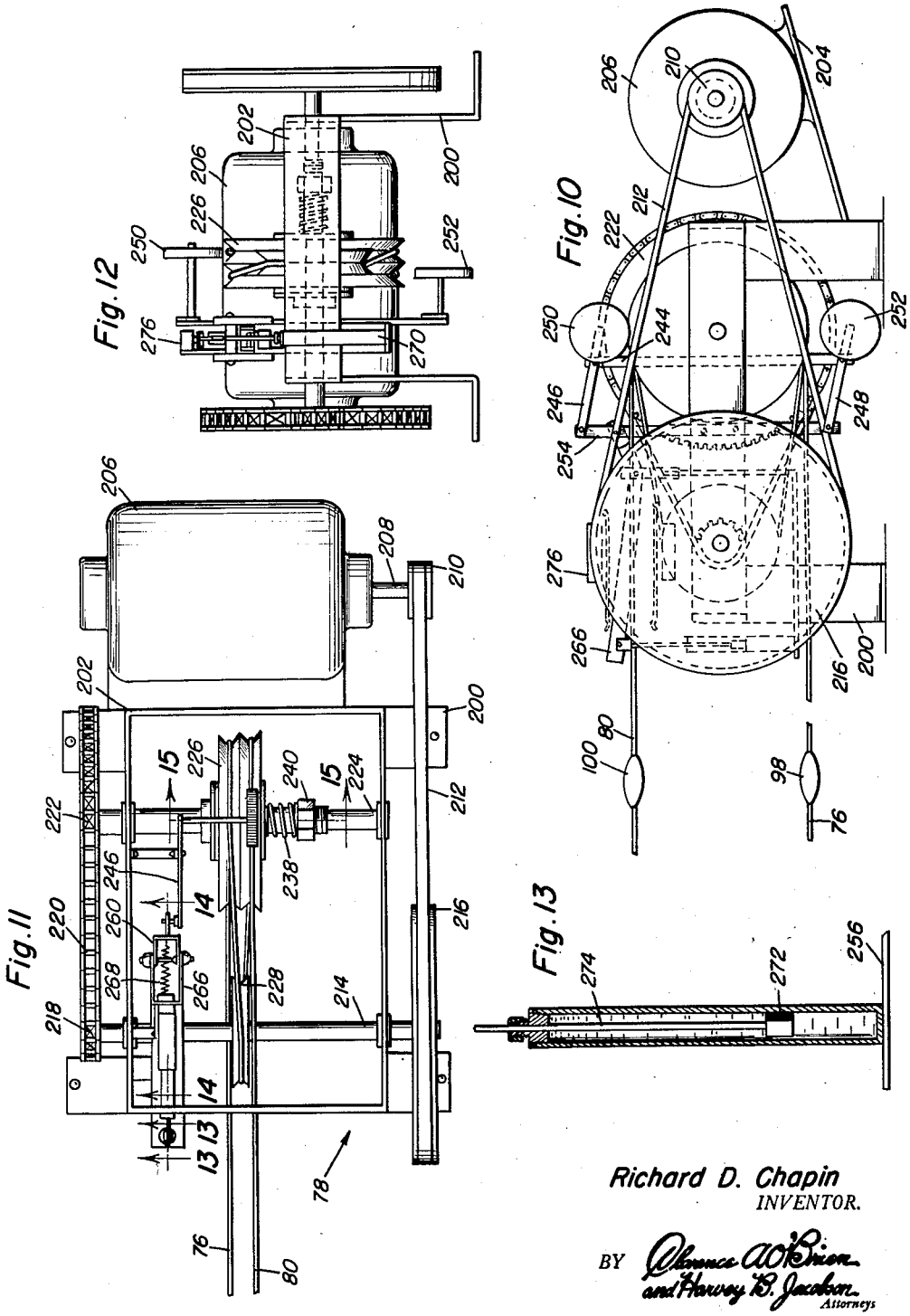

March 26, 1957  R. D. CHAPIN  2,786,715
TRACK MOUNTED SPRINKLING DEVICE
Filed March 4, 1955  6 Sheets-Sheet 5
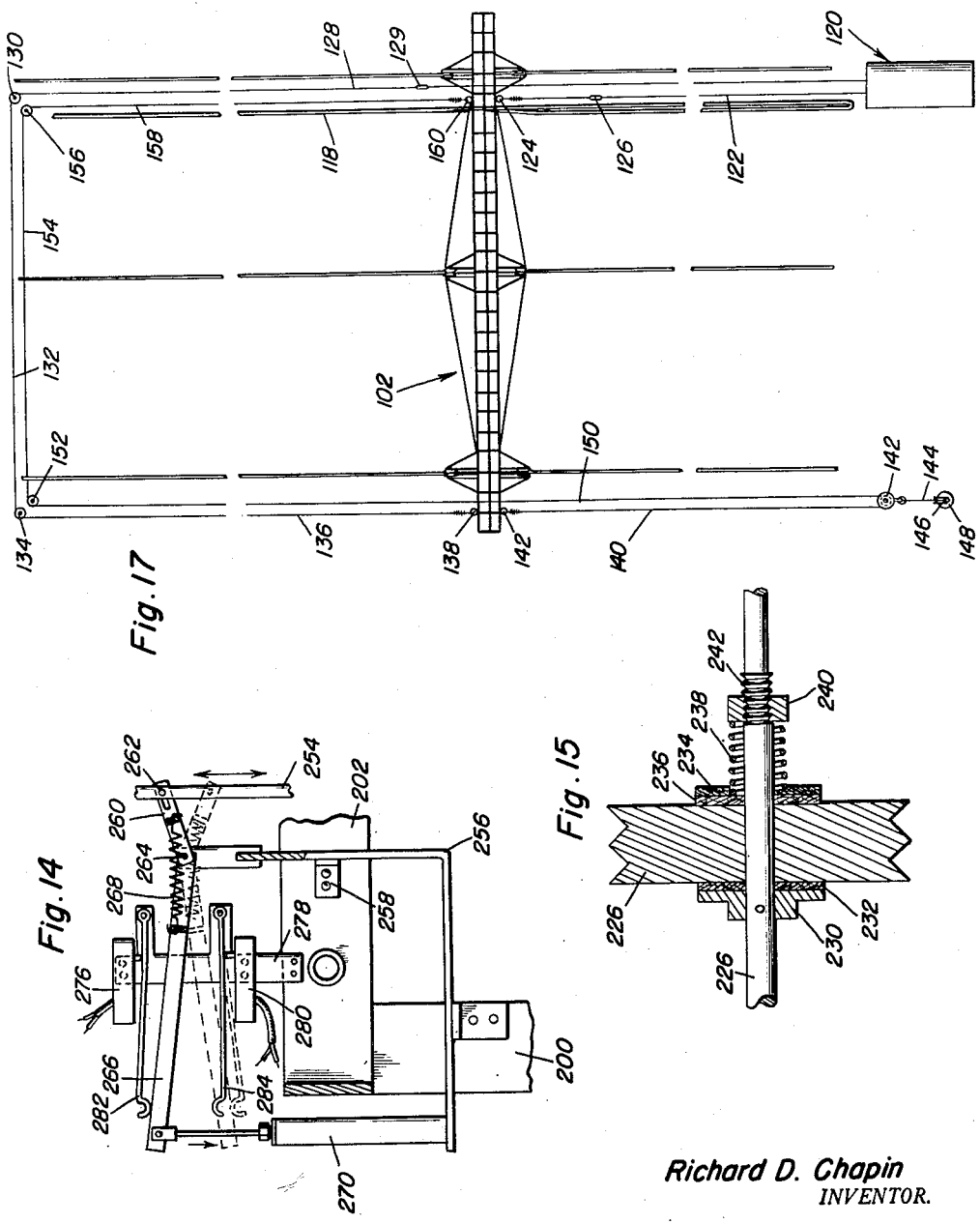
Richard D. Chapin
INVENTOR.

March 26, 1957 R. D. CHAPIN 2,786,715
TRACK MOUNTED SPRINKLING DEVICE
Filed March 4, 1955 6 Sheets-Sheet 6
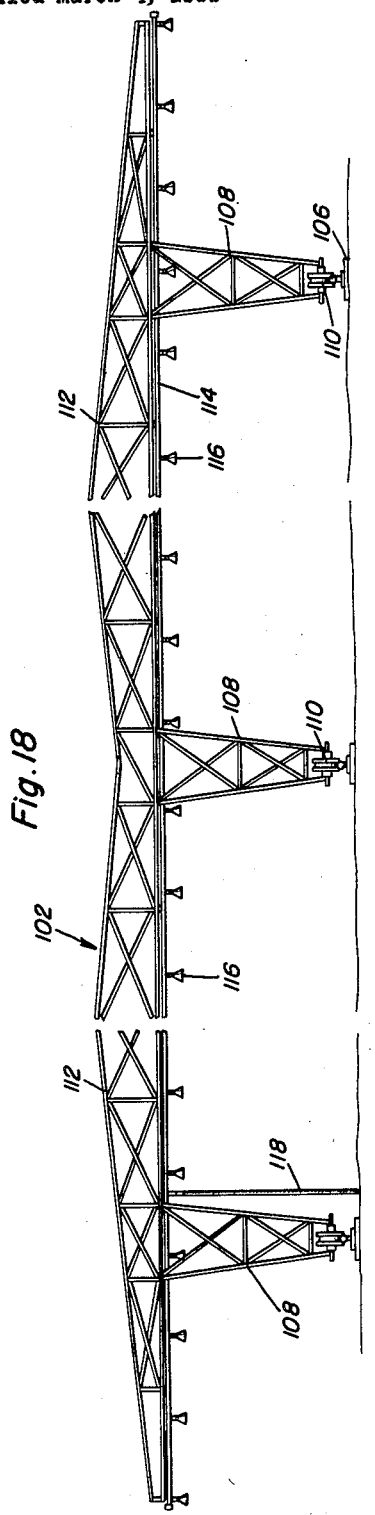
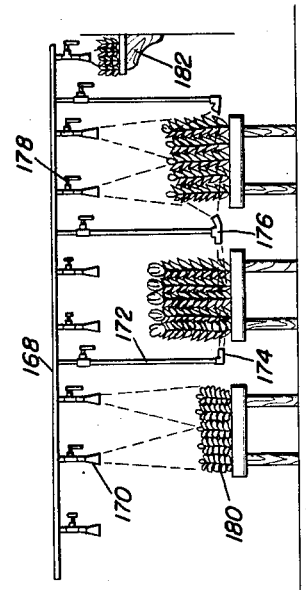
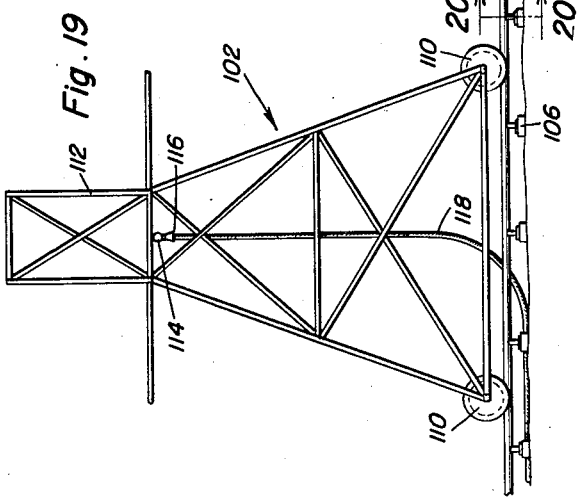
Richard D. Chapin
INVENTOR.

United States Patent Office 2,786,715
Patented Mar. 26, 1957

2,786,715

TRACK MOUNTED SPRINKLING DEVICE

Richard D. Chapin, Watertown, N. Y.

Application March 4, 1955, Serial No. 492,099

11 Claims. (Cl. 299—55)

This invention generally relates to a sprinkling device, and more specifically provides an automatic mist type watering machine that is adaptable for commercial use under field growing conditions and also adaptable for inside use in greenhouses.

An object of the present invention is to provide a sprinkling device which continuously sprays a fine mist of water over, onto or under the foliage in a desired manner.

Another object of the present invention is to provide a sprinkling device which may be utilized to water plants or foliage by the conventional water spray or by the mist method.

A further important object of the present invention is to provide a sprinkling device that may be utilized to water plants at substantially soil level, thereby retaining the foliage and blooms in substantially a dry condition which is desirable in some instances.

Another important feature of the present invention is to provide a sprinkling device which may be utilized to fertilize plants or spray insecticides in the several manners set forth in the previous objects.

Yet another important object of the present invention is to provide a sprinkling device which includes a continuously movable carriage member having a plurality of spray nozzles thereon that moves along a trackway and which upon reaching one limit of movement will automatically reverse itself and cover the entire area in repetition, thereby assuring that the area will be thoroughly watered or sprinkled at predetermined intervals.

Still another salient point in this invention is the provision of a sprinkling device having novel and improved construction which permits the utility of conventional water hoses and the like in conjunction therewith whereby the water hoses will be retained in uncoiled and unkinked condition.

Other important objects of the present invention will reside in its efficiency of operation, simplicity in construction, adaptation and utility for various purposes, automatic operation and its relatively inexpensive manufacturing cost as well as maintenance cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a top plan view of the sprinkler device of the present invention;

Figure 2 is a side elevational view of the construction of Figure 1 showing the nozzle carriage as well as the water hose carriage;

Figure 3 is an end elevational view of the construction of Figure 1 showing the details of the nozzle carriage;

Figure 4 is a perspective view showing one of the water hose supports utilized in a portion of the trackway;

Figure 5 is a vertical sectional view taken substantially upon the plane passing along section line 5—5 of Figure 4 showing the details of construction of the pivotal water hose carrying roller;

Figure 6 is a perspective view showing the rigid type of water hose carrying roller utilized in a portion of the trackway of Figure 1;

Figure 7 is an enlarged elevational view of one of the spray nozzles showing the control valve therefor;

Figure 8 is an enlarged plan view of the construction of the water hose carriage;

Figure 9 is a side elevational view of the construction of Figure 8 showing the relationship of the elements thereof;

Figure 10 is a side elevational view of the automatic reversing mechanism with the housing removed therefrom and showing the driving mechanism for moving the sprinkling device;

Figure 11 is a top plan view of the construction of Figure 10;

Figure 12 is an end elevational view of the construction of Figures 10 and 11;

Figure 13 is a vertical sectional view taken substantially along a plane passing along section line 13—13 of Figure 11, showing the construction of the hydraulic piston and cylinder arrangement;

Figure 14 is a vertical sectional view taken substantially upon a plane passing along section line 14—14 of Figure 11 showing the details of construction of the reversing switch mechanism;

Figure 15 is a vertical sectional view taken substantially upon a plane passing along section line 15—15 of Figure 11 showing the construction of the friction clutch to permit slippage of the drive mechanism;

Figure 16 is a fragmental elevational view showing the use of nozzles for watering the plants at a soil level, if desired;

Figure 17 is a top plan view of a modified form of sprinkling device of the present invention;

Figure 18 is an end elevational view of the modified form of sprinkler device of Figure 17;

Figure 19 is a side elevational view of the modified form of sprinkling device;

Figure 20 is a detail sectional view taken substantially upon a plane passing along section line 20—20 of Figure 19 showing the construction of the trackway utilized therein; and Figure 21 is a fragmental end view of a modified form of trackway and trackway engaging roller or wheel together with a keeper element that may be utilized in conjunction with the form of the sprinkling device illustrated in Figure 1 or in Figure 17.

Referring now specifically to Figures 1–9 of the drawings, it will be seen that the numeral 10 generally designates the sprinkling device of the present invention including a trackway generally designated by the numeral 12 and including a pair of elongated spaced and parallel cylindrical and tubular rods 14 mounted in vertically spaced relation at each end of transverse members 16 by an upstanding spacer 18. Flexible supporting means, such as cables 20 are provided for supporting the trackway 12 from an overhead position. The trackway 12 may be as long as desired and also, the width thereof is optional and other supporting means may be utilized in place of the flexible cable 20, depending upon the particular type of installation.

Movably positioned on the track 12 is an elongated transverse carriage generally designated by the numeral 22 and including a rectangular frame member 24 that supports a pipe member 26 having a plurality of nozzles 28 attached thereto by a fitting 30 where it is provided with a control valve 32. The frame member 26 is provided with upwardly inclined top members 34 that are joined and braced by a plurality of cross-braces 36. The central upper portion of the carriage 22 is formed with a recessed portion defined by the members 38 and two pairs of wheels or rollers 40 are journaled on the carriage 22 and rollingly engage the longitudinal rails 14 for movably supporting the carriage 22 on the trackway 12 in suspended and transverse relation. The particular number of nozzles 28 is optional, and certain of the nozzles 28 may be opened and certain of them closed, as desired.

Supported centrally of and extending vertically through the carriage 22 is a vertical pipe 42 in communication with the transverse pipe 26 and the vertical pipe 42 is connected to a flexible hose 44 by any suitable connecting means. The hose 44 is connected to a pipe line 46 that is substantially one-half the length of the trackway 12 and is connected thereto by any suitable supporting means. This pipe 46 is connected to a suitable water supply pipe that is provided with pressure and any suitable control valve may be provided therefor. As illustrated in Figures 1 and 2, it is noted that the flexible hose 44 is connected at one end to the pipe 46 and at the other end to the pipe 42 on the carriage 22 wherein the hose 44 would normally be subject to kinking and coiling and damage caused thereby. In order to eliminate such kinking, a truck or carrier generally designated by the numeral 48 is mounted on the track 12 for movement therealong. The truck or carrier 48 generally includes a frame 50 of generally polygonal construction having wheels or rollers 52 journaled thereon for engaging the longitudinal tracks 14 for movement thereon. In spaced relation to the wheels 52 and journaled on a rod 54 is a pulley 56 which receives the hose 44 in generally encircling relation wherein the hose 44 enters from the pipe 46 on the bottom of the pulley 56 and leaves from the top thereof for connection to the pipe 42, as illustrated in Figure 1. As the carriage 22 is to the right hand portion of the trackway 12, it is necessary to support the hose 44 on rollers. This is accomplished by providing upstanding brackets 58 on the transverse member 16 for journaling a supporting roller 60 thereon wherein a plurality of the supporting rollers are provided, and these rollers 60 are rigidly supported on the transverse frame member 16 in alignment with each other and in alignment with the pulley 56 whereby the hose 44 will be movably supported as it moves longitudinally following the movement of the carriage 22.

To the left hand side of the trackway 12 is provided a plurality of rollers 62 that are mounted on U-shaped brackets 64 attached to pivot arms 56 that are pivotally secured to a mounting bracket 68 that is attached to the cross-members 16. The mounting bracket 68 and the pivot arms 66 are pivotally secured together by pivot pin 70 and provided with stop means for retaining the bracket 68 and the arms 56 in aligned position. A tension coil spring 72 is provided for returning the rollers 62 to their uppermost position. It will be seen that the rollers 62 are in alignment with the rollers 60 and provide support for the hose 44 during movement of the truck 48 and the carriage 22 towards the left portion or outer extremity of the trackway 12. The truck or carrier 48 generally is in the nature of a dolly and includes an inclined arm 74 for engaging the surface of the U-shaped bracket 64 adjacent the longitudinal rails 14 for urging the rollers 62 inwardly and downwardly about pivot pin 70 until such time as the dolly or truck 48 has moved thereover whereby the roller 62 will then be moved back into its normal vertical position for engaging and supporting the hose 44 during its longitudinal movement. This action of the roller 62 is generally illustrated in Figure 5 and the engagement of the inclined arm 74 therewith is illustrated in Figure 1.

For moving the carriage 22 and the dolly or truck 48, a cable 76 is attached to the carriage 22 and goes through a device for moving said cable, as generally designated by the numeral 78, which will automatically reverse movement of the carriages 22 and 48 when the limit of their movement is reached. The cable 76 is continuous through the moving means 78 and includes an elongated portion 80 passing over spaced pulleys 82 and 84 at the other end of the trackway 12 and then proceeds in an elongated portion 86 around a pulley 88 mounted on a bracket 90 on the truck or dolly 48. This cable then forms an elongated portion 92 that is disposed over a pulley 94 and includes a counterbalancing weight 96 on the terminal end thereof. Adjacent the portion of the cable 76 attached to the carriage 22 is an enlarged member or hump 98 on the cable and another bump or hump 100 is disposed on the run of cable 80, and these bumps 98 and 100 coact with means within the cable driving means 78 for automatically reversing the direction of travel of the cable and also automatically reversing the direction of travel of the carriage 22 and the truck or dolly 48.

Inasmuch as the cable passes around the pulleys 82 and 84 and then around the pulley 88 on the truck 48, the weight 96 will at all times retain the cable in taut condition and also retain the truck or dolly 48 in spaced relation to the carriage 22 whereby the flexible hose 44 will at all times be retained in a taut condition. The bumps 98 and 100 on the cable coact with mechanism within the automatic reversing and driving device 78 to automatically reverse the direction of movement of the carriages 22 and 48, thereby forming a continuous and alternating wetting of any area positioned under the nozzles 28. Of course, the speed of movement of the nozzles 28 may be varied as desired, and the discharge therefrom may also be adjusted by the control valve 32. The rollers 60 and 62 support the flexible hose 44 during movement of the carriages 22 and 48 thereby retaining the flexible hose 44 in straight position, thereby eliminating possible damage thereto.

Referring now specifically to Figures 17–20 of the drawings, it will be seen that the numeral 102 generally designates a modified form of the sprinkler system that is especially adapted for use in the field where relatively large areas are to be sprinkled. This form of the invention generally includes a plurality of elongated rails 104 mounted on a plurality of supporting bases 106 for receiving upstanding skeletonized frameworks 108 that are equipped with roller wheels 110 at the bottom corners thereof. Extending transversely of the upstanding frameworks 108 is an elongated transverse skeletonized framework 112 supporting an elongated pipe 114 having a plurality of nozzles 116 thereon. A flexible hose 118 is provided for attachment to the transverse pipe 114 for supplying pressurized fluid thereto for discharge from the nozzles 116 whereby the area covered by the nozzles 116 will be sprinkled. The nozzles 116 may be controlled by any suitable valve means (not shown). Also, the flexible hose 118 normally rests upon the ground surface and doubles upon itself so that adequate length of the hose is provided at all times and resilient means may be provided for retaining the hose generally in looped form, as illustrated in Figure 17.

An automatic reversing means generally designated by the numeral 120 is provided for directing the movement of the carraige formed by the upstanding framework 108 and the transverse framework 112. A first cable 122 is terminally secured to an eye member 124 adjacent one end of the transverse framework 112 and includes a bump 126 thereon. The cable 122 then proceeds through the driving and reversing mechanism and includes a continuous elongated run 128 which also is provided with a bump 129 for actuating the driving and reversing mechanism 120. The cable portion 128 then passes over a pulley 130 and is formed with a continuous transverse portion 132 which passes over another pulley 134 and then includes an elongated portion 136 terminally secured to an eye member 138 at the other end of the transverse framework 112 on the opposite side thereof from the eye member 124. Another cable 140 is terminally secured to an eye member 142 on the transverse framework 112 on the same side thereof as the eye member 124 and on the opposite side from the eye member 138, and the cable 140 proceeds through a cable pulley 142 that is held taut by the cable 144 passing over a pulley 146 and provided with a vertically moving counterbalance weight 148 wherein all the cable for moving the transverse framework 112 is retained in taut condition. After the cable 140 passes through the cable 142, an elongated run 150 is provided that is parallel to the cable portions 140 and 136 and this portion of the cable passes over a pulley 152 generally alongside the pulley 134 and a transverse continuous cable portion 154 is disposed generally in parallel relation to the transverse portion 132 and is positioned over a pulley 156 generally alongside the pulley 130. After the cable leaves the pulley 156, an elongated run 158 thereof is terminally secured to an eye member 160 on the transverse framework 112 in general alignment with the eye member 124 but on the opposite side of the framework 112 wherein all portions of the framework 112 will be moved in unison and all portions of the cable will be retained in taut condition so that the automatic driving and reversing mechanism, to be described hereinafter, will be actuated by the bumps 126 and 129 on the cable portions, thereby moving the transverse frame 112 in a reciprocating manner on the tracks 104.

Figure 20 generally discloses the details of the longitudinal rails 104 which are spaced from the base 106 by a mounting plate 162 and a spacer 164 together with an elongated screw threaded fastener 166 for securing the rail 104 to the base 106. The screw fastener 166 is provided with a headed portion projecting upwardly through the cylindrical rail 104 having a surface generally flush with the peripheral surface thereof.

Referring now specifically to Figure 16, it will be seen that a pipe member 168 may be provided with a plurality of nozzles 170 and certain areas of the pipe 168 may be provided with an elongated depending pipe 172 having a horizontally extending nozzle 174 thereon or a double nozzle 176 with one portion being horizontal and the other portion spraying upwardly in an inclined direction. By utilizing the various types of nozzles with suitable control valves 178, it will be understood that plants 180 may be watered from the top thereof, only on the ground or from up under the foliage, depending upon the type of plants. Also, plants positioned on a shelf, such as that illustrated by the numeral 182, may also be watered simultaneously with the other plants 180. Therefore, it will readily be seen that the spray nozzles in the two embodiments of the invention may be adapted to various specific purposes depending upon each individual installation and use to which the sprinkling device of the present invention may find utility.

Figure 21 generally illustrates a modified form of trackway including an elongated cylindrical rail 184 mounted on suitable transverse members 186 in general alignment therewith. A framework 188 is provided with upstanding end brackets 190 having an axle 192 for journaling a wheel or roller 194 in rolling engagement with the longitudinal rail 184. Also secured to the bracket 190 in spaced relation to the axle 192 is an axle 196 for journaling a roller 198 spaced from the wheel or roller 194 and positioned below the longitudinal rail 184 wherein the roller 198 will prevent vertical movement of the roller or wheel 194 in relation to the rail 184, thereby retaining the wheel or roller 194 on the rail. This type of rail and wheel or roller arrangement may be utilized on either of the two types of sprinkling devices illustrated in the present invention, and is especially adaptable for installations having changes in terrain or the like whereby it may be that the roller 194 would tend to become disengaged from the longitudinal rail 184.

Referring now specifically to Figures 10–15 of the drawings, it will be seen that the automatic reversing and driving mechanism is illustrated and generally designated by the numeral 78. Since the reversing and driving mechanism is identical in both forms of the invention, the mechanism 78 will be specifically described. In line with this, the cables going into and leaving the mechanism are illustrated by the numerals 76 and 80, and for the purposes of description, the cable will be designated as 76 throughout the mechanism 78. Also, the bumps 98 and 100 will be described.

The reversing and driving mechanism 78 generally includes a plurality of upstanding legs 200 joined at their upper ends by an integral rectangular member 202; projecting rearwardly from the legs 200 is a supporting plate 204 carrying a reversible electric motor 206. The motor 206 is provided with a drive shaft 208 having a pulley 210 thereon for engaging a V-belt 212. Mounted forwardly of and journaled transversely of the rectangular member 202 is a shaft 214 having an enlarged V-belt pulley 216 on one end thereof in alignment with the pulley 210 for receiving the V-belt 212 whereby the shaft 214 is driven by the motor 206. At the opposite end of the shaft 214 is provided a sprocket gear 218 having a sprocket chain 220 positioned thereon in encircling relation. In alignment with the sprocket gear 218 is a sprocket gear 222 mounted on a rear transverse shaft 224 wherein the chain 220 encircles the sprocket gears 218 and 222 for driving the shaft 224 at a reduced speed. It will be understood that a V-belt may be utilized in place of the sprocket chain 220 or a sprocket chain may be utilized in place of the V-belt 212 depending upon the particular installation.

Mounted on the shaft 224 is a double V-pulley 226 and journaled on the shaft 214 is a single idler V-pulley 228 that is in alignment with the center of the double V-pulley 226. The cable 76 passes over the double pulley 226 and then around the idler pulley 228 and then around the double pulley 226 in the opposite groove thereof whereby the cable 76 will be driven by rotation of the double V-pulley 226 mounted on the shaft 224.

In order to permit slippage of the double V-pulley 226, the shaft 224 is provided with a collar 230 having a facing of friction producing material 232 on the inner surface thereof for engagement with one face of the double V-pulley 226. A second collar 234 is provided with a facing of friction producing material 236 for engaging the opopsite surface of the double V-pulley 226 and a compression coil spring 238 is provided together with a threaded nut 240 threaded onto a threaded portion 242 of the shaft 224 wherein the tension of the spring 238 may be adjusted, thereby varying the frictional resistance to relative movement between the pulley 226 and the shaft 224, thereby permitting the shaft 224 to rotate in relation to the pulley 226 in event some obstacle is in the way of the movement of the cable 76.

An elongated rod 244 is mounted on the rectangular frame member 202 and pivotally supports an upper arm 246 and a lower arm 248 which rotatably support an upper roller 250 and a lower roller 252 wherein the upper roller 250 is disposed over one of the grooves in the double groove pulley 226 and the lower roller 252 is supported under the other of the grooves in the double groove pulley 226. Interconnecting the free ends of arms 246 and 248 is an elongated connecting link 254 which will reciprocate in response to movement of rollers 250 and 252 which will pivot the arms 246 and 248 about their pivotal connections to the vertical member 244.

Referring now specifically to Figure 14, it will be seen that a bracket 256 is mounted by suitable attaching means 258 to the rectangular member 202 for pivotally supporting an arm 260 that is slidably and pivotally attached to the connecting link 254 by a pin and slot connection generally designated by the numeral 262. A pivot pin 264 connects the arm 260 to the bracket 256 and also connected by a pivot pin 264 to the bracket 256 is an elongated actuating arm 266 which is generally disposed in angular relation to the arm 260 and a tension spring 268 is provided which will urge the actuating arm 266 either upwardly or downwardly depending upon the position of the connecting link 254 since the tension spring 268 will move across the center formed by the pivot pin 264, thereby forming an overcenter spring for moving the actuating arm 266 in a vertical swinging direction about pivot pin 264.

In order to cushion and dampen the movement of the actuating arm 266, a cylinder 270 is provided having a piston 272 slidably mounted therein together with a piston rod 274 connected thereto and connected at its upper end to the free end of the actuating arm 256 by a pin and slot connection. The cylinder 270 is connected to a forwardly projecting portion of the bracket 256 whereby the movement of the actuating arm 266 will be somewhat slowed for a purpose described hereinafter.

A microswitch 276 is provided on a supporting bracket 278 above the actuating arm 266 and a microswitch 280 is provided therebelow wherein the switch 276 is provided with a pivotal lever 282 and the switch 280 is provided with a similar lever 284 for actuation of the microswitches 276 and 280 wherein the microswitch 276 drives the electric motor 206 in one direction and the microswitch 280 will drive the electric motor in the other direction. When one of the bumps 98 and 100 on the cable 76 moves over the double pulley 226 and engages either the upper roller 250 or the lower roller 252 depending upon the direction of movement of the cable 76, the outward movement of the roller will cause movement of the interconnecting link 254 whereby pivotal movement of the arm 260 will be caused, thereby actuating the arm 266 for de-energizing one of the microswitches and energizing the other of the microswitches. In order to permit the electric motor 206 to come to a complete stop, the movement of the actuating arm 266 is retarded somewhat by the piston and cylinder arrangement 270 and 272, whereby the entire apparatus will come to a standstill and then the other switch will be actuated for rotating the motor in the opposite direction wherein the entire apparatus will move in the opposite direction. In the event an obstruction is encountered by the mechanism being moved by the cable 76, the friction clutch material 232 and 236 will permit the double V-pulley 226 to rotate in relation to the shaft 224 thereby preventing unnecessary damage to the equipment or to the obstacle encountered. It will be understood that any suitable drive means may be utilized in place of the specific V-belts and chain drives as illustrated and the only necessity being that the rotation of the double V-pulley 226 be reduced to approximately 50 to 75 R. P. M.

It will be understood that the reversing and driving mechanism 78 as illustrated in Figures 10-15 may be utilized with either form of the invention for moving the nozzles in the desired manner for spraying water or discharging mist onto the area intended.

In addition to the uses of the present invention as previously set forth, it also will be understood that the device may be utilized for transporting plants, soil and the like inside greenhouses by the use of the carriage or dolly of heavier construction or the like. Further, due to the adaptation of the device for various purposes, all types of watering can be accomplished automatically wherein either the "mist method" may be utilized or the "spray method" may be utilized. The mist method is advantageous in rootings of certain plants and rootings of cuttings or the like. Also, plants grown under the mist method have a more abundant foliage and a more luxuriant growth which provides an excellent quality for various types of plants wherein the growth of such plants may be easily controlled.

Heavy watering at soil level can be accomplished, which is particularly useful when a crop is in full bloom or for other reasons, such as may be desirable during pollination or the like. Fertilizer nutrients in a fluid solution may be applied by the present invention by any of the previously discussed methods, and insecticides can also be applied in any of the previous methods wherein the insecticides may be directed to the underside of the leaves when desirable. Also, the present invention permits the use of highly poisonous insecticides wherein the operator will not come into contact with the insecticide or fumes therefrom.

Since the water from each nozzle is spread over the entire length of the trackway, larger nozzles may be utilized than those normally used in a stationary system whereby fertilizer nutrients and insecticides may be more advantageously used without the usual clogging of the nozzles caused thereby. It will be seen that the labor required for spraying or wetting down a desired area is substantially eliminated, thereby reducing the cost of operation. Also, if desired, the machine may be made entirely automatic by attaching an electric time clock to the electrical circuit of the reversing and driving mechanism 78 and an electrical solenoid valve for controlling the water supply, which will enable the machine to stop and start automatically without attention of an operator.

The entire sprinkling device may operate within a greenhouse without interfering with the normal operation of the greenhouse and without destroying or contacting plants or workmen therein. Also, it will be understood that one driving and reversing mechanism 78 may be utilized for driving a plurality of dollies or carriages using a similar cable hook-up wherein each end of the dolly is moved in substantially a continuous and equal manner.

The foregoing is intended to be illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the appended claims.

What is claimed as new is as follows:

1. A sprinkling device comprising an elongated track, a transversely extending carriage movably supported on said track, a plurality of discharge nozzles mounted on said carriage, a flexible hose supplying fluid to said nozzles, means for supporting and positioning said hose during movement of said carriage, means for moving said carriage along said track, and automatic control means for reversing the direction of movement of said carriage when it reaches the remote ends of said track, said hose positioning means including a plurality of aligned rollers mounted on said track, a pulley movably mounted on said track for receiving said hose, said pulley having a weight member attached thereto for retaining said hose in taut position, said rollers engaging and supporting said hose during movement of said pulley along said track.

2. A sprinkling device comprising an elongated track, a transversely extending carriage movably supported on said track, a plurality of discharge nozzles mounted on said carriage, a flexible hose supplying fluid to said nozzles, means for supporting and positioning said hose during movement of said carriage, means for moving said carriage along said track, and automatic control means for reversing the direction of movement of said carriage when it reaches the remote ends of said track, driving and control means including a reversible motor, a pulley driven by said motor, a flexible cable passing over said pulley and connected to said carriage for movement thereof, a pair of bumps on said cable, means associated with said pulley for engagement by said bumps for automatically reversing the rotation of said motor, thereby reversing the direction of movement of the pulley, cable and carriage, said bumps being located on the cable for reversing the rotation of said motor adjacent the remote limits of movement of the carriage, said bump engaging means including a pair of pivotally mounted rollers, and switch means actuated by said rollers for changing the rotation of said motor, and means for delaying the actuation of said switch means to permit the motor to be stopped before reversal thereof.

3. A sprinkling device comprising an elongated track, a transversely extending carriage movably supported on said track, a plurality of discharge nozzles mounted on said carriage, a flexible hose supplying fluid to said nozzles, means for supporting and positioning said hose during movement of said carriage, means for moving said carriage along said track, and automatic control means for reversing the direction of movement of said carriage when it reaches the remote ends of said track, said hose positioning means including a plurality of aligned rollers mounted on said track, a movable pulley receiving said hose, said pulley having a weight member attached thereto for retaining said hose in taut position, said rollers engaging and supporting said hose during movement of said pulley along said track, driving and control means including a reversible motor, a pulley driven by said motor, a flexible cable passing over said pulley and connected to said carriage for movement thereof, a pair of bumps on said cable, means associated with said pulley for engagement by said bumps for automatically reversing the rotation of said motor thereby reversing the direction of movement of the pulley, cable and carriage, said bumps being located on the cable for reversing the rotation of said motor adjacent the remote limits of movement of the carriage.

4. A sprinkling device comprising an elongated track, a transversely extending carriage movably supported on said track, a plurality of discharge nozzles mounted on said carriage, a flexible hose supplying fluid to said nozzles, means for supporting and positioning said hose during movement of said carriage, means for moving said carriage along said track, and automatic control means for reversing the direction of movement of said carriage when it reaches the remote ends of said track, said hose positioning means including a plurality of aligned rollers mounted on said track, a movable pulley receiving said hose, said pulley having a weight member attached thereto for retaining said hose in taut position, said rollers engaging and supporting said hose during movement of said pulley along said track, driving and control means including a reversible motor, a pulley driven by said motor, a flexible cable passing over said pulley and connected to said carriage for movement thereof, a pair of bumps on said cable, means associated with said pulley for engagement by said bumps for automatically reversing the rotation of said motor thereby reversing the direction of movement of the pulley, cable and carriage, said bumps being located on the cable for reversing the rotation of said motor adjacent the remote limits of movement of the carriage, said bumps engaging means including a pair of pivotally mounted rollers, and switch means actuated by said rollers for changing the rotation of said motor, and means for delaying the actuation of said switch means to permit the motor to be stopped before reversal thereof.

5. A sprinkling device comprising an elongated track, a transversely extending carriage movably supported on said track, a plurality of discharge nozzles mounted on said carriage, a flexible hose supplying fluid to said nozzles, means for supporting and positioning said hose during movement of said carriage, means for moving said carriage along said track, and automatic control means for reversing the direction of movement of said carriage when it reaches the remote ends of said track, driving and control means including a reversible motor, a pulley driven by said motor, a flexible cable passing over said pulley and connected to said carriage for movement thereof, a pair of bumps on said cable, means associated with said pulley for engagement by said bumps for automatically reversing the rotation of said motor, thereby reversing the direction of movement of the pulley, cable and carriage, said bumps being located on the cable for reversing the rotation of said motor adjacent the remote limits of movement of the carriage, said bump engaging means including a pair of pivotally mounted rollers, and switch means actuated by said rollers for changing the rotation of said motor, and means for delaying the actuation of said switch means to permit the motor to be stopped before reversal thereof, said cable including a counterbalancing device for retaining the cable taut and synchronizing movement of the remote ends of the transverse carriage.

6. A sprinkling device comprising an elongated track, a carriage movably supported on said track, a pipe supported on said carriage and extending transversely of the track, a plurality of discharge nozzles on said pipe, an elongated flexible hose connected to said pipe, means for supporting said hose alongside said track in generally parallel relation thereto, means for keeping the hose in taut condition during movement of said carriage, cable means connected to said carriage for moving the carriage along said track, means for moving said cable means, and means actuated by movement of the cable means for reversing the direction of movement thereof for reversing the direction of movement of the carriage, said hose being connected to a fluid supply pipe mounted alongside the track, said means for retaining the hose in taut condition including a dolly movably supported on said track, a pulley rotatably supported on said dolly for receiving the hose thereover, and counterbalance means connected to said dolly for urging the dolly away from the carriage whereby movement of the end of the hose attached to the pipe on the carriage permits movement of the dolly at one-half the speed of the carriage.

7. The combination of claim 6 wherein said cable moving means includes a reversible motor, said means actuated by said cable means including a reversing switch, and means for prolonging the movement of said switch for permitting the motor to stop before energizing the motor for reverse rotation.

8. The combination of claim 6 wherein said hose supporting means includes a plurality of aligned rollers, means mounting said rollers for lateral pivotal movement, spring means biasing the rollers to an operative position, and means on said dolly for engaging said roller mounting means for moving the rollers laterally to inoperative position to permit passage of the dolly past the rollers after which the rollers return to operative position.

9. The combination of claim 6 wherein certain of said nozzles include an elongated extension pipe depending from the transverse pipe, said extension pipe terminating at its lower end in inturned portion having the nozzle mounted thereon for discharging fluid onto the undersurface of plant leaves.

10. The combination of claim 6 wherein said track is suspended, said carriage being provided with rollers engaging the upper surface of the track, and means on said carriage underlying the track thereby retaining the carriage on the track.

11. A fluid sprinkling device comprising an elongated track, a carriage movably supported on said track, a pipe supported on said carriage and extending transversely of the track, a plurality of discharge nozzles on said pipe, an elongated flexible hose connected to said pipe, means for supporting said hose alongside said track, means for keeping the hose in taut condition during movement of said carriage, cable means connected to said carriage for moving the carriage along said track, means for moving said cable means, and means actuated by movement of the cable means for reversing the direction of movement thereof for reversing the direction of movement of the carriage, said means for keeping the hose in taut condition including a dolly movably mounted on said track, means on said dolly for engagement with said hose, means biasing said dolly away from the carriage for retaining the hose between the dolly and carriage in taut condition.

References Cited in the file of this patent

UNITED STATES PATENTS

| | | |
|---|---|---|
| 659,916 | Davis | Oct. 16, 1900 |
| 998,579 | Herz | July 18, 1911 |
| 1,017,578 | McMillan | Feb. 13, 1912 |
| 1,073,834 | Anderson | Sept. 23, 1913 |
| 1,943,655 | Cummings | Jan. 16, 1934 |
| 2,249,130 | Gunther | July 15, 1941 |
| 2,556,428 | Kooken | June 12, 1951 |